(12) United States Patent
Podolsky

(10) Patent No.: US 7,315,799 B1
(45) Date of Patent: Jan. 1, 2008

(54) METHOD OF AND ARTICLE OF MANUFACTURE FOR DETERMINING PROBABILITY OF AVIAN COLLISION

(75) Inventor: Richard Podolsky, Rockport, ME (US)

(73) Assignee: Perot Systems Corporation, Plano, TX (US)

( * ) Notice: Subject to any disclaimer, the term of this patent is extended or adjusted under 35 U.S.C. 154(b) by 591 days.

(21) Appl. No.: 10/718,271

(22) Filed: Nov. 20, 2003

Related U.S. Application Data

(60) Provisional application No. 60/501,443, filed on Sep. 9, 2003.

(51) Int. Cl.
*G06F 17/10* (2006.01)
(52) U.S. Cl. .................. 703/2; 703/6; 703/8
(58) Field of Classification Search ............. 703/2, 703/6–8; 701/301; 702/1, 2
See application file for complete search history.

(56) References Cited

U.S. PATENT DOCUMENTS

| | | | |
|---|---|---|---|
| 5,774,088 A * | 6/1998 | Kreithen | 342/22 |
| 6,250,255 B1 * | 6/2001 | Lenhardt et al. | 119/713 |
| 6,623,243 B1 * | 9/2003 | Hodos | 416/61 |
| 2006/0041381 A1 * | 2/2006 | Simon et al. | 701/301 |

OTHER PUBLICATIONS

"The mathematical model of bird collisions with wind turbine rotors", V.A. Tucker, Journal of Solar Energy Engineering, vol. 118, issue 4, Nov. 1996.*
Elsam. Offshore Wind Farm. Horns Rev Annual Status Report for Environmental Monitoring Programme, Tech-wise, Oct. 2002.*

* cited by examiner

*Primary Examiner*—Fred Ferris
(74) *Attorney, Agent, or Firm*—Winstead PC

(57) ABSTRACT

A method of calculating probability of collision by birds within a wind park includes modeling a wind turbine to create a wind-turbine model, modeling a challenged bird to create a challenged-bird model, modeling a wind park to create a wind-park model, the wind park comprising at least one of the wind turbine, and calculating a probability of wind-turbine collision by the challenged bird. The step of calculating includes using the wind-turbine model, the challenged-bird model, and the wind-park model. A method for calculating a probability of collision by animals other than birds with structures including, but not limited to, wind turbines, is also disclosed.

45 Claims, 4 Drawing Sheets

METHOD OF AND ARTICLE OF MANUFACTURE FOR DETERMINING PROBABILITY OF AVIAN COLLISION

CROSS-REFERENCE TO RELATED APPLICATIONS

This patent application claims priority from and incorporates by reference the entire disclosure of a U.S. Provisional Patent No. 60/501,443 Application and filed on Sep. 9, 2003.

BACKGROUND OF THE INVENTION

1. Technical Field of the Invention

The present invention is generally related to determining a probability of collision by animals with objects in their environment and, more particularly, but not by way of limitation, to a method and an article of manufacture for determining probability of collision by birds with wind turbines located within a wind park.

2. Description of Related Art

Wind parks that are comprised of multiple wind turbines have been installed in increasing numbers in recent years in order to provide wind energy. Wind energy benefits the environment by reducing dependence upon fossil fuels and also by reducing greenhouse gas emissions. However, wind parks also impact the environment in which they are installed in negative ways such as, for example, sound, aesthetics, and risks to wild life, including birds. A major environmental concern of wind parks is the risk of bird collisions with the wind turbines that make up the wind park.

Wind energy is growing faster in the U.S. and Europe than any other form of electricity generation. Studies performed at existing wind parks have documented avian mortality. Estimates from these studies range from an avian mortality rate per year of 0 to one of 4.45. Even greater avian mortality rates than those described above have also been documented. At present, there is no acceptable way to estimate the probability of avian collision with wind parks. It would be desirable to be able to simulate the probability of avian collision with a wind park in an effort to minimize avian mortality resulting from the collisions. Further, it would be desirable to predict the risk that a wind park presents to birds while the wind park is being designed rather than waiting until construction of the wind park has begun. Additionally, it would be desirable to be able to examine the parameters that have the greatest impact on the probability of avian collision.

SUMMARY OF THE INVENTION

The present invention relates to a method of determining probability of avian collision. More particularly, in an embodiment of the invention, a method of calculating probability of collision by birds within a wind park includes modeling a wind turbine to create a wind-turbine model, modeling a challenged bird to create a challenged-bird model, modeling a wind park to create a wind-park model, the wind park comprising at least one of the wind turbine, and calculating a probability of wind-turbine collision by the challenged bird. The step of calculating includes using the wind-turbine model, the challenged-bird model, and the wind-park model.

In another embodiment of the invention, an article of manufacture for calculating probability of collision by birds within a wind park includes at least one computer readable medium and processor instructions contained on the at least one computer readable medium, the processor instructions configured to be readable from the at least one computer readable medium by at least one processor. The processor instructions cause the at least one processor to operate as to model a wind turbine to create a wind-turbine model, model a challenged bird to create a challenged-bird model, and model a wind park to create a wind-park model. The wind park includes at least one of the wind turbine. The processor instructions also cause the at least one processor to calculate a probability of wind-turbine collision by the challenged bird. The calculation includes using the wind-turbine model, the challenged-bird model, and the wind-park model.

BRIEF DESCRIPTION OF THE DRAWINGS

A more complete understanding of the principles of the present invention may be obtained by reference to the following Detailed Description, when taken in conjunction with the accompanying Drawings, wherein.

DETAILED DESCRIPTION OF EXEMPLARY EMBODIMENTS OF THE INVENTION

Figure 1:
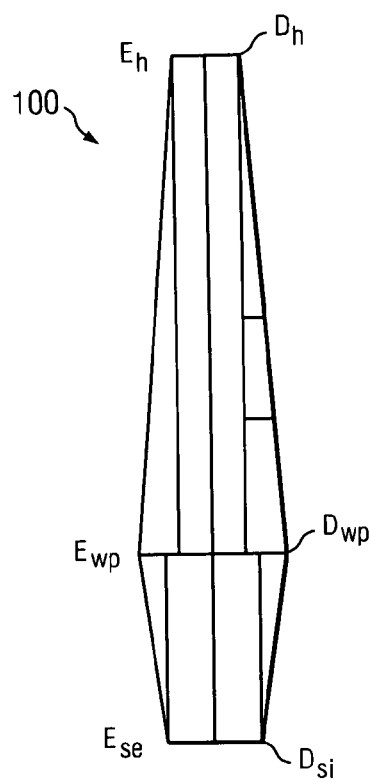
FIG. 1 illustrates a monopole 100 of an exemplary wind turbine in accordance with principles of the invention.

Embodiments of the invention make it possible to calculate a probability of avian collision with a wind park and also to determine why some wind parks are more dangerous to birds than others in order to attempt to minimize avian mortality. A level of danger of a wind park to birds flying through the wind park can be assessed during planning stages before construction of the wind park begins via a probabilistic model that predicts avian collision rates. An interactive model in accordance with principles of the invention simulates bird collisions in wind parks, simulates a probability of collision for various models of wind turbine and species of birds, and permits various parameters that impact avian mortality to be examined. Embodiments of the invention permit a user to determine which parameters have the greatest impact on avian collision, and by implication, avian mortality. For example, simulations performed using an embodiment of the invention have indicated that for relatively large, slow-moving, slow-rotating wind turbines, the speed at which the wind-turbine rotor blades rotate is relatively unimportant as far as probability of avian collision is concerned.

An embodiment of the invention has been implemented using MICROSOFT EXCEL, although other software environments could be used without departing from principles of the invention. In an embodiment of the invention that utilizes EXCEL, a user-interface worksheet allows the user to generate data even if the user has little or no experience with the model itself or with EXCEL itself.

In an embodiment of the invention, the user may input data relative to wind turbines to be used in the wind park, what bird species will encounter the wind park, and dimensions of the wind park. Table 1 shows exemplary categories of data (and corresponding units) relative to the wind turbines, the wind park, and bird species that may be input to various embodiments of the invention.

| BIRD VARIABLES | WIND TURBINE VARIABLES | WIND PARK VARIABLES |
|---|---|---|
| Bird Speed (m/s) | Turbine Model: | No. of Rows of Turbines |
| Bird Length (m) | Rotor Blade: | No. of Columns of Turbines |
| Wingspan (m) | Rotor Radius (m) | Distance Between Turbine Rows (m) |
| Elevation (m) | Blade Width at Hub (m) | Distance Between Turbine Columns (m) |
| Time Spent in wind park (s) | Blade Depth at Hub (m) | |
|  | Blade Radius at Widest Point (m) | |
| No. of birds/species | Blade Width at Tip (m) | |
| % avoiders | Blade Depth at Tip (m) | |
| % attractors | Blade Pitch (degrees) | |
|  | No. of Blades | |
|  | Nacelle: | |
|  | Height (m) | |
|  | Width (m) | |
|  | Length (m) | |
|  | Monopole: | |
|  | Height (m) | |
|  | Diameter at Sea Level (m) | |
|  | Diameter at Ground Level (m) | |
|  | Diameter at Widest Point (m) | |
|  | Height at Widest Point (m) | |
|  | Diameter at Hub (m) | |

A first category of data pertains to wind-turbine dimensions. Embodiments of the invention permit elevation-specific wind-turbine dimensional data to be used, so that avian collision probabilities can be computed as a function of elevation. The avian probability of collision varies as elevation varies, since, for example, a monopole of the wind turbine may be narrower at one elevation versus another or a rotor may be encountered only at certain elevations. It would typically be impractical to report wind-turbine dimensions at every elevation on, for example, an inch-by-inch basis. Therefore, in embodiments of the invention, as few inputs as possible are used, as further described below, in order to allow the wind-turbine dimensions to be determined at any desired elevation.

FIG. 1 illustrates a monopole 100 of an exemplary wind turbine in accordance with principles of the invention. Under some circumstances, the monopole 100 is where greater avian collision risk is concentrated. For example, in many larger wind turbines, the greater the elevation, the greater the material and mass in the monopole, which characteristics lead to greater avian collision risk.

Diameter measurements of the monopole at: 1) a widest point ($D_{wp}$), 2) a hub ($D_h$), and 3) zero elevation (e.g., sea or ground level) ($D_{sl}$) are input. Corresponding elevations $E_h$, $E_{wp}$, and $E_{sl}$ are shown on FIG. 1, $E_h$ representing the elevation of the hub, $E_{wp}$ representing the elevation of the widest point, and $E_{sl}$ representing the elevation at ground or sea level. The dimensions of the monopole 100 may thus be modeled using similar triangles. Embodiments of the invention may therefore be made sensitive to how much monopole diameter is expected to be encountered by birds at a given elevation.

Given the three monopole elevations and corresponding diameters discussed above, the diameter of the monopole 100 encountered by a bird can be determined at any desired elevation. Even though FIG. 1 illustrates an exemplary monopole 100 that is relatively narrow at zero elevation, widens to a widest point, and then narrows again as elevation increases toward the hub, those having skill in the art will appreciate that monopoles having more complex shapes can be modeled in similar fashion to that discussed above.

If a flight elevation (E) of a challenged bird is less than $E_{wp}$ and greater than $E_{sl}$, the diameter ($D_m$) of the monopole 100 as a function of elevation is as follows:

$$D_m = \frac{E(D_{wp} - D_{sl})}{E_{wp}} + D_{sl} \qquad (1)$$

where $D_m(E)$ is the diameter of the monopole as a function of elevation. Similarly, if the flight elevation of the challenged bird is less than $E_h$ and greater than $E_{wp}$, the monopole diameter encountered by the challenged bird is as follows:

$$D_m = \frac{(D_h - D_{wp})(E_h - E)}{E_h - E_{wp}} + D_h \qquad (2)$$

where, as above, $D_m(E)$ is the diameter of the monopole encountered by the challenged bird as a function of elevation.

Figure 2B:
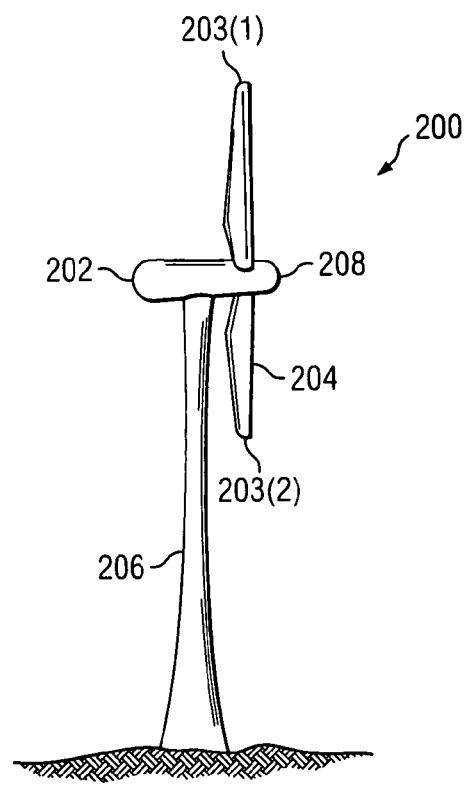
FIGS. 2A-B illustrate an exemplary wind turbine 200, including a nacelle 202, a rotor 204, a monopole 206, and a hub 208.
Figure 2A:
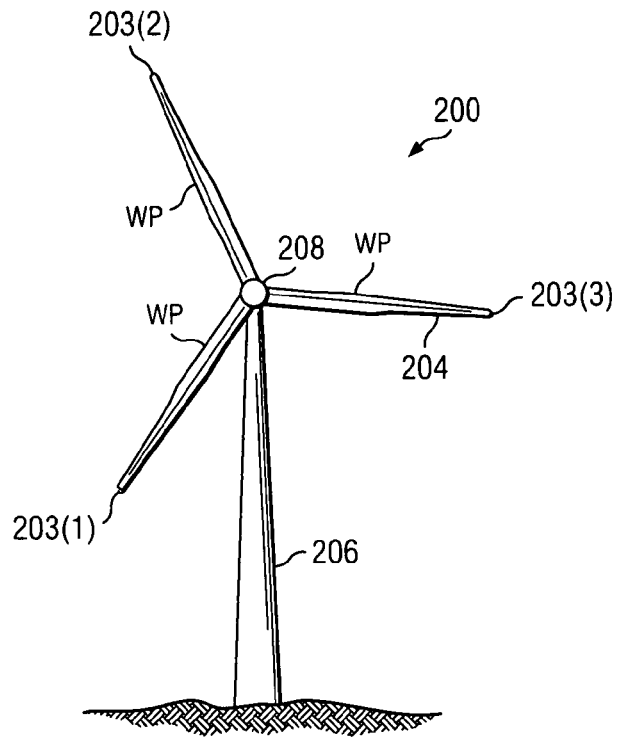

FIGS. 2A-2B illustrate an exemplary wind turbine 200, including a nacelle 202, a rotor 204, a monopole 206, and a hub 208. FIG. 2A shows a front view of the wind turbine 200, while FIG. 2B shows a side view of the wind turbine 200. In FIG. 2A, blades 203(1)-(3) of the rotor 204 are visible, while in FIG. 2(B), only the blades 203(1)-(2) of the blades 203(1)-(3) are visible. In FIG. 2A, a widest point (wp) and an outermost tip (tip) are shown for each of the blades 203(1)-(3). In an embodiment of the invention, a width ($W_h$) of each of the blades 203(1)-(3) of the rotor 204 at the hub 208, a width ($W_{wp}$) at a widest point of each of the blades 203(1)-(3), and a width ($W_t$) at the outermost tip of each of the blades 203(1)-(3) are input. A radius ($R_{wp}$) of the blades 203(1)-(3) at the widest point of the blade from the hub 208 to the outermost tip of the blades 203(1)-(3) and a pitch (α) of the blades 203(1)-(3) are also input to the model. In the wind turbine 200 shown in FIGS. 2A and 2B, each of the blades 203(1)-(3) of the rotor 204 are identical. The pitch (a) of the blades 203(1)-(3) refers to the degree, to which the blade 203 is flying flat with regard to the wind or is spilling wind. Each of the blades 203(1)-(3) are identical, although this need not necessarily be the case.

Blade width ($W_b$) of the blades 203(1)-(3) at a particular distance (H) from the hub is determined as follows when H is less than the radius ($R_{wp}$) at the widest point of the blades 203(1)-(3):

$$W_b = \frac{H(W_{wp} - W_h)}{R_{wp}} + W_h \quad (3)$$

In similar fashion, if H is greater than $R_{wp}$, $W_b$ is determined as follows:

$$W_b = \frac{(W_t - W_{wp})(R - H)}{R - R_{wp}} + W_t \quad (4)$$

where R is the distance from the hub to the outermost tip of the blade 203.

The apparent blade width ($W_{ab}$) is determined as follows:

$$W_{ab} = W_b \cos(\alpha) \quad (5)$$

while the apparent blade depth ($D_b$) is determined as follows:

$$D_b = W_b \sin(\alpha) \quad (6)$$

Figure 3:
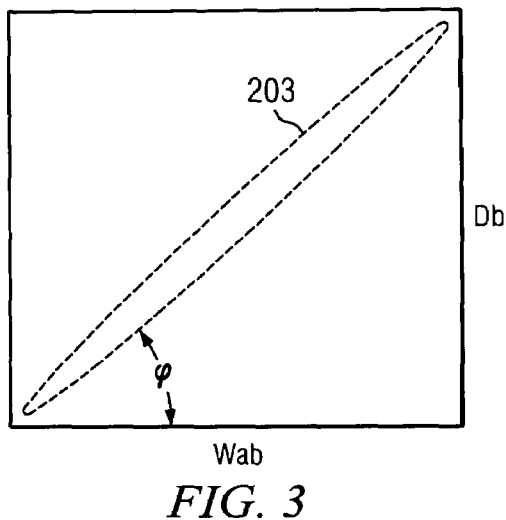
FIG. 3 is a side view of a blade of the rotor 204 in accordance with principles of the invention.

FIG. 3 is a side view of the blade 203 of the rotor 204 in accordance with principles of the invention. α represents the angle of the blade relative to a vector orthogonal to the smear of the rotor 204. α is 90° when the blade 203 has maximal exposure to an oncoming bird flying perpendicularly to a plane of rotation of the blade. α is 0° when the blade 203 has minimal exposure to the oncoming bird.

Figure 4:
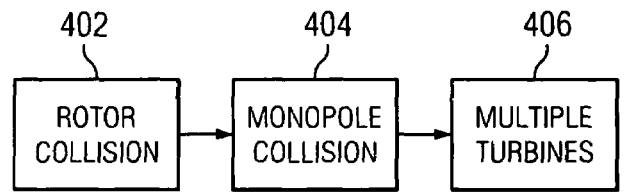
FIG. 4 is a flow diagram that illustrates an overall wind-park modeling process in accordance with principles of the invention.

FIG. 4 is a flow diagram that illustrates an overall wind-park modeling process in accordance with principles of the invention. The flow 400 begins at step 402. At step 402, a probability of avian collision by a single bird flying through a rotor of a wind turbine is determined. From step 402, execution proceeds to step 404. At step 404, a probability of avian collision with a monopole of the wind turbine is determined. From step 404, execution proceeds to step 406. At step 406, a probability of avian collision with multiple wind turbines is determined.

Once an individual wind turbine has been modeled as described above with respect to FIGS. 1-3, simulations of a bird flying through the modeled wind turbine at different elevations, at different lateral positions, and at different angles of attack relative to the wind turbine are performed at steps 402 and 404. At step 406, a multiple-wind-turbine case in which wind turbines are distributed in space is modeled.

In steps 402 and 404, the previously-input dimensions of the single wind turbine are increased by half of a length of the bird, because if a bird is less than half its length from a portion of the wind turbine, a portion of the bird will likely strike the wind turbine. Thus, avian collision is a function of, among other things, the size of the bird encountering the wind turbine. Larger birds thus typically have a greater probability of collision with the wind turbine than do smaller birds due to the size of their bodies.

A smear of the rotating rotor is also taken into account in step 402. The faster the rotor rotates, the greater the rotor smear. It follows that a slower bird is exposed to more risk of collision than a faster bird, all other factors being equal. Dwell time is a term used to describe the amount of time that a bird is within the space in which the rotor rotates. Wind-turbine variable definitions and corresponding units are as follows:

L—bird length (m)

Wing—bird wingspan (m)

S—speed of the bird (m/s)

LD—lag distance (time spent in the plane of the rotor) (m)

DT—danger time (i.e., dwell time) (s)

AS—blade speed (degrees/s)

BD—blade depth (m)

BW—blade width (m)

P(R)—probability of collision as a function of R

VT—vertical angle of attack (measured as an angle from orthogonal vector)

VT—Horizontal angle of a attack (measured as an angle from orthogonal vector)

BSA—blade swept angle for each of the blades through the danger time (degrees)

AoD—arc of danger (arc along the circle corresponding to the blade swept angle) (m)

TAoD—total arc of danger (m)

R—radius at which the bird enters the rotor smear (m)

Figure 5:
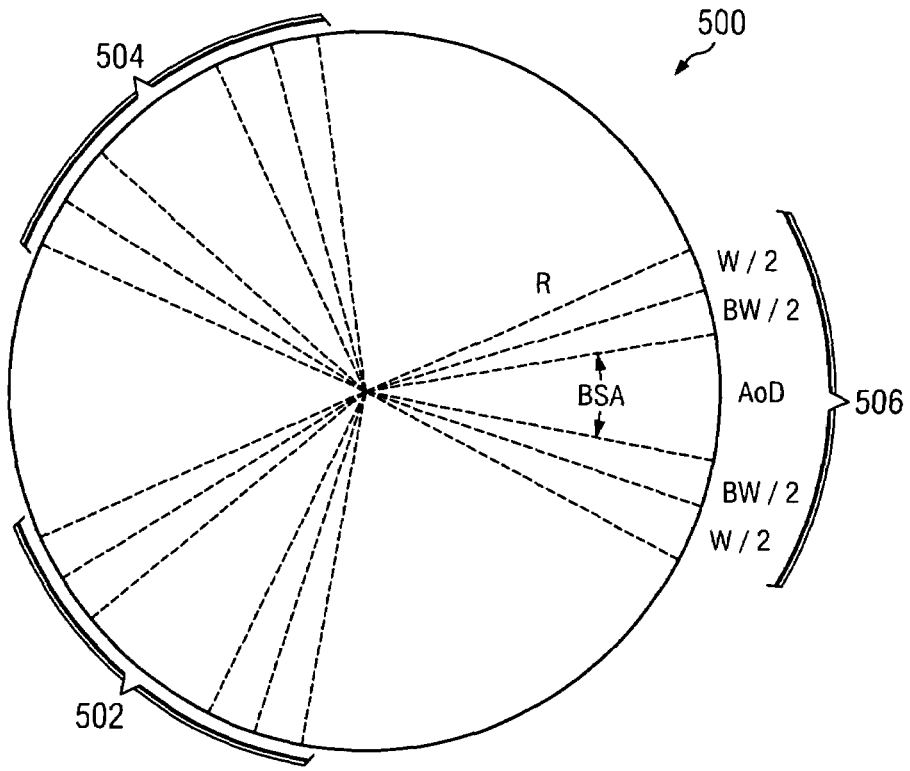
FIG. 5 is a graph that illustrates how blade width (BW) and bird size may be taken into consideration in accordance with principles of the invention.

FIG. 5 is a graph that illustrates how blade width (BW) and bird size may be taken into consideration in accordance with principles of the invention. A smear 500 of a rotor such as, for example, the rotor 204, is shown. Three rotating blades 502, 504, and 506 of a rotor are shown in FIG. 5. In embodiments of the invention, the largest linear dimension of the bird is used, so that the model produces the most conservative results; in other words, if a bird's length from beak to tail is greater than the bird's wingspan, the length is used. In contrast, if the bird's wingspan is greater than the bird's length, the wingspan is used. More conservative results are achieved by using the greatest dimension, since a larger bird is at greater risk of colliding with a wind turbine than a smaller bird, all other factors being equal. Even though embodiments of the invention use the largest dimension of the bird, a user can use any dimension desired in order to simulate, for example, a bird flying with its wings parallel to or perpendicular to the rotating blades of the rotor:

Calculation of various quantities of interest relative to a single turbine will now be described. A lag distance (LD), which is a distance that the bird spends in the rotor smear based upon an angle of attack of the bird, is calculated as follows:

$$LD = \frac{0.3}{\cos(VT)\cos(HT)} \quad (7)$$

The danger time (DT), which is also referred to as the dwell time, is calculated as follows:

$$DT = \frac{L + LD}{S} \quad (8)$$

The angular speed (AS), which is the angular speed of the rotor, is calculated based upon the revolutions per minute (rpm) of the rotor as follows:

$$AS = \frac{rpm}{60}(360) \quad (9)$$

The arc of danger (AoD), which is an arc along a circle corresponding to the blade swept angle (BSA), is calculated as follows:

$$AoD = \frac{BSA}{360}(2\pi R) = \frac{BSA}{180}\pi R \quad (10)$$

As will be readily apparent to those having skill in the art, the arc of danger (AoD) is a conversion of the blade swept angle (BSA) into an arc along the outer edge of the smear of the rotor. The total arc of danger (TAoD), encountered by the bird challenging the rotor is calculated as follows:

$$TAoD = AoD + \text{Wing} + BW \quad (11)$$

The probability (P) of the bird colliding with the rotor is thus calculated as follows:

$$P = \frac{3 TAoD}{2\pi R} \quad (12)$$

TAoD is multiplied by 3 to account for all three rotor blades and is then divided by the total circumference of the circle traced by the rotor smear in order to calculate the probability of an avian collision with the rotor. In embodiments of the invention, in order to account for the bird's size, half of the blade width (BW/2) and half of the bird's wingspan (Wing/2) are added to each side of the arc of danger (AoD).

Although Equation 12 is set to model a three-bladed rotor, the number of rotors is available as an input variable in embodiments of the invention, since wind turbines with a different number of rotor blades are sometimes used in wind parks. In addition, maintaining the number of rotor blades as an input variable allows a user to set the number of blades to zero in order to assess how the probability of avian collision changes if the rotor of the wind turbine is removed altogether.

Equation 13 is a simplified form of the probability (P) of avian collision with a rotor of a single wind turbine.

$$P = \frac{3(rpm)(\pi R)(L + BD)}{2\pi R(30S + \text{Wing} + BW)} \quad (13)$$

In embodiments of the invention, the bird is modeled as a planar surface that has been circularly curved about one of its axes. The rotor width is converted to a curved distance along the circumference of a circle formed by the rotor blade tips. Treating the bird and the rotor width as noted above permits embodiments of the invention to be simplified, since the input variables can be used with minimal conversion necessary in order to calculate P. Of course, other assumptions with respect to modeling the bird can be made as desired without departing from principles of the invention. In embodiments of the invention, the bird is assumed to enter the rotor plane with its belly directly facing the hub in order to model a worst-case scenario. Once the probability (P) of avian collision has been determined for a single wind turbine at a plurality of elevations and angles of attack, embodiments of the invention utilize an iterative process across multiple wind turbines in order to compute a probability of collision within a wind park.

Figure 6:
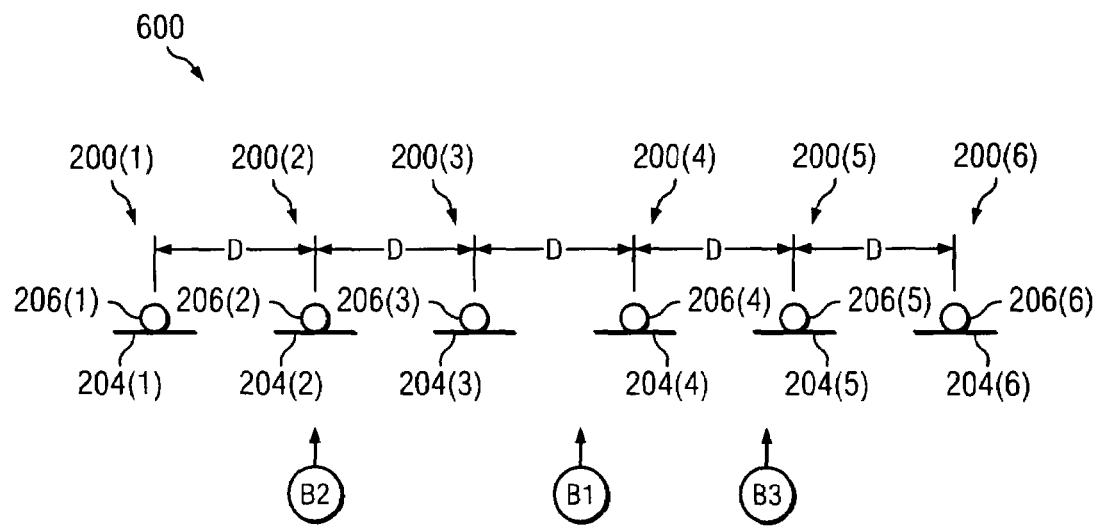
FIG. 6 is a diagram that illustrates an overhead view of a row 600 of wind turbines 200(1)-(6) of a wind park in accordance with principles of the invention.

FIG. 6 is a diagram that illustrates an overhead view of a row 600 of wind turbines 200(1)-(6) of a wind park (not shown) in accordance with principles of the invention. In order to model the wind park and determine the probability of avian collision for the wind park, what is referred to as the "row method" may be employed. In the row method, successive horizontal slices of a single row of wind turbines are examined. Each of the wind turbines 200(1)-(6) is shown as including a corresponding monopole 206 and corresponding rotor 204. As a bird progresses toward the row 600 of the wind turbines 200(1)-(6), each successive slice may include the monopole 206, the rotor 204, or both the monopole 206 and the rotor 204. An accumulated probability of avian collision is computed for each row 600 of the wind park until all of the rows 600(1)-(n) of the wind park have been accounted for.

In FIG. 6, three exemplary birds B1-B3 are shown approaching the row 600 of the wind turbines 200(1)-(6). Each of the wind turbines 200(1)-(6) is separated from the next wind turbine 200(1)-(6) in the row 600 by a distance (D). A bird B1 is shown approaching the row 600 between the wind turbine 200(3) and the wind turbine 200(4). So long as the bird B1 is further than one-half the largest dimension of the bird B1 from both the rotor 204(3) and the rotor 204(4), the bird B1 will not collide with any wind turbine 200 of the row 600. In contrast, a bird B2 is approaching the row 600 directly towards the monopole 206(2) and the rotor 204(2). Thus, the bird B2 will definitely collide with the monopole 206(2) or the rotor 204(2). A bird B3 is shown approaching the row 600 such that the bird B3 will likely encounter the rotor 204(5), but will not encounter the monopole 206(5). Since the bird B3 will not encounter the monopole 206(5), the bird 3 may, but need not necessarily, collide with the wind turbine 200(5).

In embodiments of the invention, it is assumed that, once a bird enters the wind park (i.e., encounters a first row of wind turbines) at a given flight elevation, the given flight elevation is held constant. While holding the bird's flight elevation constant through the wind park does serve to simplify various calculations, the flight elevation may be varied as deemed appropriate in a particular application without departing from principles of the invention. For example, a user could change the flight elevation manually for each row to model a case in which a bird passes a first row at a flight elevation of 20 feet and passes a second row at a flight elevation of 100 feet.

FIG. 6 shows that, at a given flight elevation, a bird may encounter open spaces in which no collision will occur, spaces in which only a monopole is present, spaces in which only a rotor is present, and spaces in which both a monopole and a rotor are present. In FIG. 6, since D is the distance between the wind-turbine hubs, if the bird chooses a flight path that is located greater than half of the bird's largest dimension from any wind turbine in the row under consideration, the bird will not collide with any wind turbine in the row under consideration.

The probability of avian collision for a given row of wind turbines for all relevant flight elevations, lateral positions, and angles of attack is calculated as a ratio of a number of flight paths that result in a collision (i.e., collision flight paths) to a total number of flight paths (i.e., total flight paths) for the given row. The closer wind turbines in a row are to one another (i.e., as D decreases), the more the ratio of collision flight paths to total flight paths increases. The ratio of collision flight paths to total flight paths increases because more material from the wind turbines is packed into a smaller area; therefore, if the total flight paths are held constant, the probability of an avian collision increases. It thus follows that spacing the wind turbines as far apart from one another as possible reduces the probability of a strike, all other factors being equal.

Once the probability ($P_{row}$) of avian collision as the bird passes through a single row of wind turbines has been calculated, the probability ($P_{tot}$) of avian collision given multiple wind-turbine rows is as follows:

$$P_{tot} = (1-P_{row})^{row} \quad (14)$$

Although the row method has been described above, it will be appreciated by those skilled in the art that a wind park can be modeled in other ways than those described above without departing from principles of the invention.

In embodiments of the invention, at least two different collision-probability cases are determined. A first case is referred to as the worst-case scenario. In the worst-case scenario, it is assumed that the bird is flying perpendicularly relative to the plane of rotation of the wind-turbine rotor (i.e., the bird has maximal exposure to the rotating rotors). In contrast, in a second case, the best-case scenario, the bird is assumed to be flying parallel to the plane of rotation of the wind-turbine rotor. FIG. 2A illustrates the wind turbine 200 in the worst-case scenario orientation, while FIG. 2B illustrates the wind turbine 200 in the best-case scenario orientation.

Figure 7:
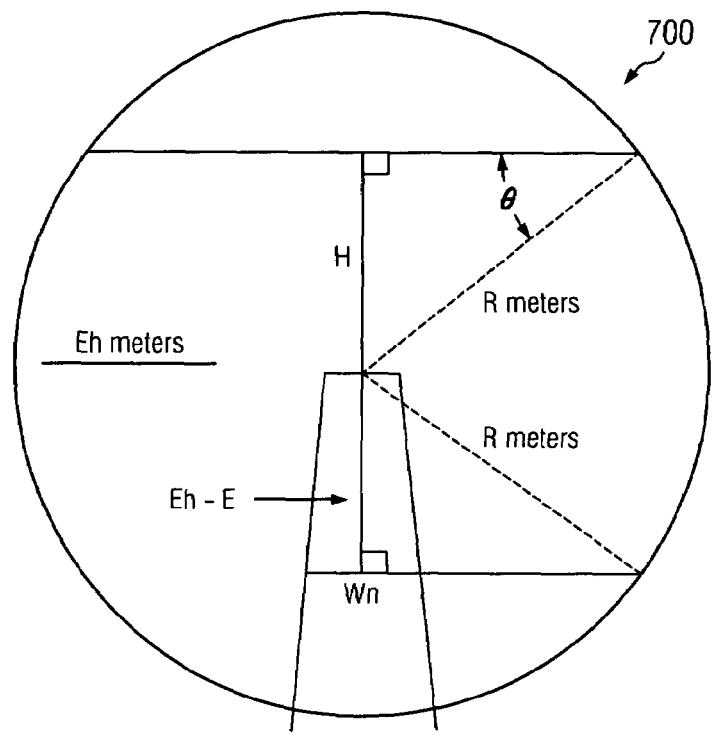
FIG. 7 illustrates quantities used in calculations of a worst-case scenario possibility of a bird striking a turbine 700 in accordance with principles of the present invention.

FIG. 7 illustrates quantities used in calculations of a worst-case scenario possibility of a bird striking a turbine 700 in accordance with principles of the present invention. In FIG. 7, R is the radius of the rotor, H is the orthogonal distance from the hub to the bird entering the plane of rotation of the rotor, and C is a chord on a circle traced by the rotating rotor that is parallel to the ground at the flight elevation of the bird.

P(x) is a two-dimensional probability of avian collision as a function of the radius of attack of the bird. Additional quantities utilized by embodiments of the invention are $D_r$, which is the distance between rows of wind turbines in the wind park, and $D_c$, which is the distance between columns of wind turbines in the wind park. Embodiments of the invention simulate a best case scenario or a worst case scenario as a constant in a given run of the model. However, in similar fashion to the discussion of varying flight elevation in a given run, embodiments of the invention could be run in a best case scenario mode for particular rows or columns of a wind park and in a worst case scenario mode for other rows or columns of the wind park.

Referring again to FIG. 7, if the flight elevation (E) is less than $E_h+R$ and greater than $E_h$, then $$H = E - E_h \quad (15)$$

$$T = \sin^{-1}\left(\frac{H}{R}\right) \quad (16)$$

and $$C = R\sin(90° - T) \quad (17)$$

The average probability ($P_{ac}$) of avian collision along the chord, whose length is 2 C, is as follows:

$$P_{ac} = P\left(\frac{R-H}{2}\right) \quad (18)$$

while the strike probability per row or column is as follows:

$$P_{row,column} = \frac{2CP_{ac}}{D_c, D_r} \quad (19)$$

The probability (Prow) of avian collision per row is based upon the distance between the wind turbines in a row; therefore, the distance between the columns impacts the strike probability per row, while the distance between the rows impacts the avian collision probability ($P_{col}$) per column.

In similar fashion to the above, if the flight elevation (E) is less than $E_h$ and greater than $E_h-R$, the avian collision probability along $D_m=1$. In addition, $$C = R\sin\left[90° - \sin^{-1}\left(\frac{E_h - H}{R}\right)\right] \quad (20)$$

and $$C_m = 2C - (D_m + \text{Wing}) \quad (21)$$

wherein $C_m$ represents the chord minus the monopole. The average avian collision probability along $C_m$ is as follows:

$$P_{ac} = P\left(\frac{R-H}{2}\right) \quad (22)$$

and the strike probability per row or column is as follows:

$$P_{row,column} = \frac{D_m + \text{Wing} + C_m(P_{ac})}{D_c, D_r} \quad (23)$$

If the flight elevation (E) is less than $E_h-R$, the probability (Prow) of strike per row is as follows:

$$P_{row} = \frac{D_m + \text{Wing}}{D} \quad (24)$$

The wingspan (Wing) must be added to the monopole diameter because, as noted above, if the bird passes to the left or right of the pole within one-half of the bird's wingspan, then some part of the bird will collide with the monopole.

The probability of a collision at a given elevation of the best-case scenario is calculated in similar fashion to that of the worse-case scenario described above. In particular, if the flight elevation (E) is less than $E_h+R$ and greater than $E_h$, then:

$$H = E - E_h \quad (25)$$

and the probability of a strike per row or column is as follows:

$$P_{row,column} = \frac{D_b(H) + Wing}{D_c, D_r} \quad (26)$$

If the flight elevation (E) is less than $E_h$ and greater than $E_h-R$, the probability of strike per row or column is as follows:

$$P_{row,column} = \frac{D_b(H) + D_m + Wing}{D_c, D_r} \quad (27)$$

If the elevation (E) is less than $E_h-R$, the probability of strike per row or column is as follows:

$$P_{row,column} = \frac{D_m + Wing}{D_c, D_r} \quad (28)$$

In embodiments of the invention, the worst-case scenario and the best-case scenario are used to bracket all intermediate cases such as, for example, when a bird encounters the wind park at an greater than 0° and less than 90°.

Equation 29 is an expression for calculating a value for the probability of avian collision for the entire wind park:

$$P_{tot} = 1 - (1 - P_{row}(h))^{row, col} \quad (29)$$

After a value has been generated for the probability of avian collision per row or column, the probability of collision for the entire wind park is obtained by taking the number of rows or columns that are crossed and inputting that value into Equation 29.

In order to factor a bird's speed into the collision-probability calculations, embodiments of the invention use an equation for rows crossed per unit of time spent by the bird in the wind park. In order to keep the model conservative, it is assumed that the bird covers the distance between rows as quickly as possible given the bird's flight velocity (i.e., the bird travels in a straight line). Non-linear flight paths may be simulated by reducing the flight speed of the bird. The formula for rows crossed per second is as follows:

$$\text{Rows crossed}(t) = \frac{(\text{flight speed})(t)}{\text{Avg. distance b/w rows}} \quad (30)$$

Embodiments to the invention also include an input that allows a user to account for birds that are able to see and thereby avoid a wind turbines. For example, a 0.95 avoidance rate may be input, meaning that 95% of birds will avoid a wind turbine and 5% are not avoiders (and are also not attracted to the turbine). This 5% of the birds instead defaults to a random case used by the model generally. In embodiments of the invention, the avoiding rate is applied per row.

Another input is included in embodiments of the invention to account for birds that are attracted to wind turbines. This input is analogous to and functionally the inverse of the avoider input. A 0.95 attractor rate means that, at each row, 95% of the birds will definitely be attracted to and therefore strike a wind turbine and 5% of the attractors will be subject to the random case as per the model generally. The avoider and attractor inputs are not necessarily intended to be accurate descriptions of bird behavior, but are rather intended to allow the user to make embodiments of the invention more biologically realistic. The general model remains the random case.

Figure 8:
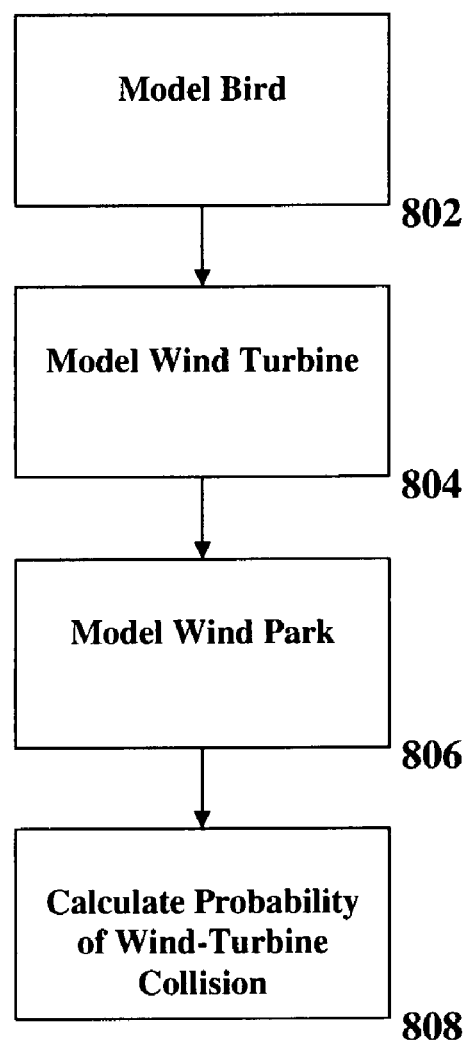
FIG. 8 is a flow diagram that illustrates a modeling process.

FIG. 8 is a flow diagram that illustrates a modeling process 800. The process 800 begins at step 802. At step 802, an approaching bird is modeled to create an approaching-bird model. From step 802, execution proceeds to step 804. At step 804, a wind turbine is modeled to create a wind-turbine model. From step 804, execution proceeds to step 806. At step 806, a wind park is modeled to create a wind-park model. From step 806, execution proceeds to step 808. At step 808, using the wind-turbine model, the approaching-bird model, and the wind-park model, a probability of wind-turbine collision by the approaching bird is calculated.

Embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory).

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims. For example, principles of the present invention are not limited to birds or to wind turbines located within a wind park, but could instead be applied to any structure placed in a given structure area in the environment and used to determine the probabilities of collision by animals with those structures. For instance, principles of the present invention could be applied to offshore oil rigs placed in the ocean and used to determine the probabilities of collision by marine life with those oil rigs.

What is claimed is:

1. A method of calculating probability of collision by birds within a wind park, the method comprising:

modeling a wind turbine to create a wind-turbine model;

modeling an approaching bird to create an approaching-bird model;
modeling a wind park to create a wind-park model, the wind park comprising more than one wind turbine;
calculating a probability of wind-turbine collision by the approaching bird;
conveying the probability of wind-turbine collision;
wherein the step of calculating comprises using the wind-turbine model, the approaching-bird model, and the wind-park model; and
wherein the step of modeling the wind turbine comprises modeling a rotor and at least one of a nacelle, a monopole, and a hub.

2. The method of claim 1, wherein the step of modeling the wind turbine comprises:
dimensionally modeling the wind turbine; and
inputting a speed of a rotor of the wind turbine.

3. The method of claim 2, wherein the step of dimensionally modeling the wind turbine comprises:
inputting a blade depth of the rotor;
inputting a blade width of the rotor; and
modeling a monopole of the wind turbine.

4. The method of claim 1, wherein the step of modeling the approaching bird comprises:
modeling the approaching bird as a curved surface, and
wherein the approaching-bird model assumes that the approaching bird enters a plane of the rotor of the wind turbine with a belly of the approaching bird facing a hub of the rotor.

5. The method of claim 1, wherein the step of modeling the wind park comprises modeling a row of the plurality of the wind turbine.

6. The method of claim 5, wherein the step of modeling the wind park comprises determining a number of rows in the wind park.

7. The method of claim 5, wherein the step of modeling the wind park comprises determining an inter-wind-turbine distance.

8. The method of claim 1, wherein the step of calculating the probability of collision by the approaching bird comprises:
calculating a worst-case collision probability per row by the approaching bird; and
calculating a best-case collision probability per row by the approaching bird.

9. The method of claim 8, wherein:
the step of calculating the worst-case collision probability per row by the approaching bird is performed at a plurality of approaching-bird flight elevations; and
the step of calculating the best-case collision probability per row by the approaching bird is performed at the plurality of approaching-bird flight elevations.

10. The method of claim 1, wherein the step of calculating the probability of collision by the approaching bird comprises:
calculating a worst-case collision probability by the approaching bird for the wind park; and
calculating a best-case collision probability by the approaching bird for the wind park.

11. The method of claim 10, wherein:

$P_{wc} = 1 - (1 - P_{wcr})^{row}$;

$P_{wc}$ is the worst-case collision probability by the approaching bird for the wind park;
$P_{wcr}$ is the worst-case collision probability by the approaching bird per row; and
row is the number of rows in the wind park.

12. The method of claim 11, wherein $P_{wc}$ and $P_{wcr}$ are each a function of the approaching-bird flight elevation.

13. The method of claim 1, wherein the approaching bird is modeled as an attractor.

14. The method of claim 1, wherein the approaching bird is modeled as an avoider.

15. The method of claim 1, wherein a non-linear flight path of the approaching bird is simulated by adjusting a flight speed of the approaching bird.

16. An article of manufacture for calculating probability of collision by birds within a wind park, the article of manufacture comprising:
at least one computer readable medium; and
processor instructions contained on the at least one computer readable medium, the processor instructions configured to be readable from the at least one computer readable medium by at least one processor and thereby cause the at least one processor to operate as to:
model a wind turbine to create a wind-turbine model;
model an approaching bird to create an approaching-bird model;
model a wind park to create a wind-park model, the wind park comprising more than one wind turbine;
calculate a probability of wind-turbine collision by the approaching bird;
convey the probability of wind-turbine collision;
wherein the calculation comprises using the wind-turbine model, the approaching-bird model, and the wind-park model; and
wherein the step of modeling of the wind turbine comprises modeling a rotor and at least one of a nacelle, a monopole, and a hub.

17. The article of claim 16, wherein the processor instructions cause the at least one processor to:
dimensionally model the wind turbine; and
use a speed of a rotor of the wind turbine.

18. The article of claim 17, wherein the processor instructions are configured to cause the at least one processor to:
use a blade depth of the rotor;
use a blade width of the rotor; and
model a monopole of the wind turbine.

19. The article of claim 16, wherein the processor instructions are configured to cause the at least one processor to:
model the approaching bird as a curved surface; and
wherein the approaching-bird model assumes that the approaching bird enters a plane of the rotor of the wind turbine with a belly of the approaching bird facing a hub of the rotor.

20. The article of claim 16, wherein the processor instructions are configured to cause the at least one processor to model a row of the plurality of the wind turbine.

21. The article of claim 20, wherein the wind-park model comprises a number of rows in the wind park.

22. The article of claim 20, wherein the wind-park model comprises at least one inter-wind-turbine distance.

23. The article of claim 16, wherein the processor instructions are configured to cause the at least one processor to:
calculate a worst-case collision probability per row by the approaching bird; and
calculate a best-case collision probability per row by the approaching bird.

24. The article of claim 23, wherein the processor instructions are configured to cause the at least one processor to:
calculate the worst-case collision probability per row by the approaching bird at a plurality of approaching-bird flight elevations; and calculate the best-case collision probability per row by the approaching bird at the plurality of approaching-bird flight elevations.

25. The article of claim 16, wherein the processor instructions are configured to cause the at least one processor to:
calculate a worst-case collision probability by the approaching bird for the wind park; and
calculate a best-case collision probability by the approaching bird for the wind park.

26. The article of claim 25, wherein:

$P_{wc}=1-(1-P_{wcr})^{row}$;

$P_{wc}$ is the worst-case collision probability by the approaching bird for the wind park;
$P_{wcr}$ is the worst-case collision probability by the approaching bird per row; and
row is the number of rows in the wind park.

27. The article of claim 26, wherein $P_{wc}$ and $P_{wcr}$ are each a function of the approaching-bird flight elevation.

28. The article of claim 16, wherein the approaching bird is modeled as an attractor.

29. The article of claim 16, wherein the approaching bird is modeled as an avoider.

30. The article of claim 16, wherein the processor instructions are configured to cause the at least one processor to operate so as to simulate a non-linear flight path of the approaching bird by adjusting a flight speed of the approaching bird.

31. A method of calculating probability of collision by birds with at least one structure, the method comprising:
modeling a structure of the at least one structure to create a structure model;
modeling an approaching bird to create an approaching-bird model;
modeling a structure area to create a structure-area model, the structure area comprising more than one of the at least one structure;
calculating a probability of structure collision by the approaching bird;
conveying the probability of structure collision; and
wherein the step of calculating comprises using the structure model, the approaching-bird model, and the structure-area model.

32. The method of claim 31, wherein the step of modeling the structure comprises dimensionally modeling the structure.

33. The method of claim 31, wherein the step of modeling the structure area comprises modeling a row of the at least one structure.

34. The method of claim 33, wherein the step of modeling the structure area comprises determining a number of rows in the structure area.

35. The method of claim 31, wherein the step of calculating the probability of collision by the approaching bird comprises:
calculating a worst-case collision probability per row by the approaching bird; and
calculating a best-case collision probability per row by the approaching bird.

36. The method of claim 31, wherein the step of calculating the probability of collision by the approaching bird comprises:
calculating a worst-case collision probability by the approaching bird for the structure area; and
calculating a best-case collision probability by the approaching bird for the structure area.

37. The method of claim 36, wherein:

$P_{wc}=1-(1-P_{wcr})^{row}$;

$P_{wc}$ is the worst-case collision probability by the approaching bird for the structure area;
$P_{wcr}$ is the worst-case collision probability by the approaching bird per row; and
row is the number of rows in the structure area.

38. An article of manufacture for calculating probability of collision by birds within a structure area, the article of manufacture comprising:
at least one computer readable medium; and
processor instructions contained on the at least one computer readable medium, the processor instructions configured to be readable from the at least one computer readable medium by at least one processor and thereby cause the at least one processor to operate as to:
model a structure to create a structure model;
model an approaching bird to create an approaching-bird model;
model the structure area to create a structure-area model, the structure area comprising more than one of the structure;
calculate a probability of structure collision by the approaching bird;
convey the probability of a structure collision; and
wherein the calculation comprises using the structure model, the approaching-bird model, and the structure-area model.

39. The article of claim 38, wherein the processor instructions cause the at least one processor to dimensionally model the structure.

40. The article of claim 38, wherein the processor instructions are configured to cause the at least one processor to model the approaching bird as a curved surface.

41. The article of claim 38, wherein the processor instructions are configured to cause the at least one processor to model a row of the at least one structure.

42. The article of claim 41, wherein the structure-area model comprises a number of rows in the structure area.

43. The article of claim 38, wherein the processor instructions are configured to cause the at least one processor to:
calculate a worst-case collision probability per row by the approaching bird; and
calculate a best-case collision probability per row by the approaching bird.

44. The article of claim 38, wherein the processor instructions are configured to cause the at least one processor to:
calculate a worst-case collision probability by the approaching bird for the structure area; and
calculate a best-case collision probability by the approaching bird for the structure area.

45. The article of claim 44, wherein:

$P_{wc}=1-(1-P)^{row}$;

$P_{wc}$ is the worst-case collision probability by the approaching bird for the structure area;
$P_{wcr}$ is the worst-case collision probability by the approaching bird per row; and
row is the number of rows in the structure area.

* * * * *

UNITED STATES PATENT AND TRADEMARK OFFICE
CERTIFICATE OF CORRECTION

PATENT NO. : 7,315,799 B1
APPLICATION NO. : 10/718271
DATED : January 1, 2008
INVENTOR(S) : Richard Podolsky It is certified that error appears in the above-identified patent and that said Letters Patent is hereby corrected as shown below:

COLUMN 6, LINE 41

Replace [VT] with --HT-- before "-Horizontal angle"

COLUMN 16, CLAIM 45, LINE 56

Replace [$P_{wc} = 1-(1-P)^{row}$] with --$P_{wc} = 1-(1-P_{wcr})^{row}$--

Signed and Sealed this

Fifth Day of August, 2008

JON W. DUDAS
*Director of the United States Patent and Trademark Office*